D. MARINSKY.
MACHINE FOR MAKING GARMENT SECURING DEVICES.
APPLICATION FILED JUNE 24, 1915.
1,168,662.
Patented Jan. 18, 1916.
3 SHEETS—SHEET 3.
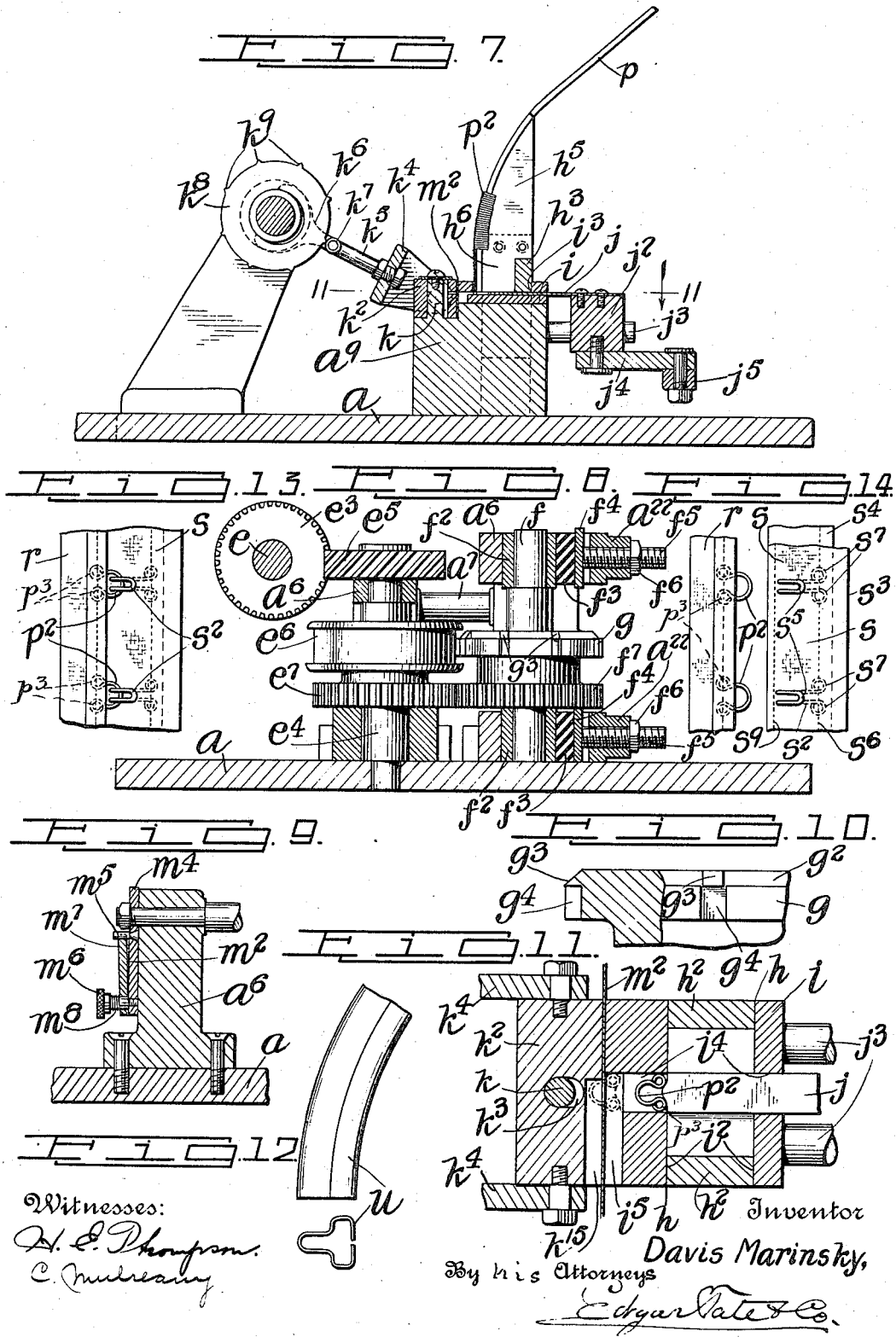
Witnesses:
H. E. Thompson
C. Mulreany
Inventor
Davis Marinsky,
By his Attorneys
Edgar Tate & Co.

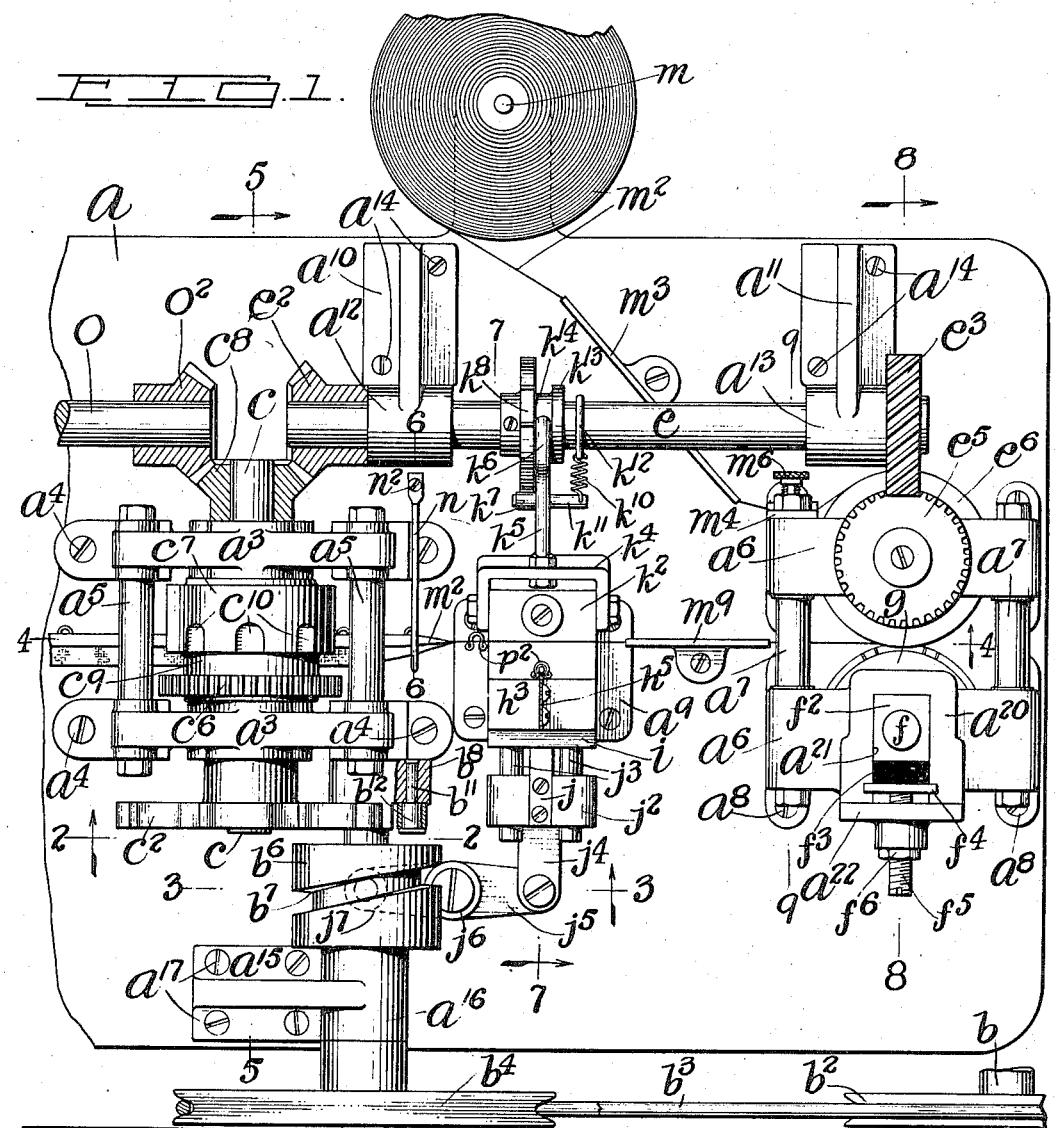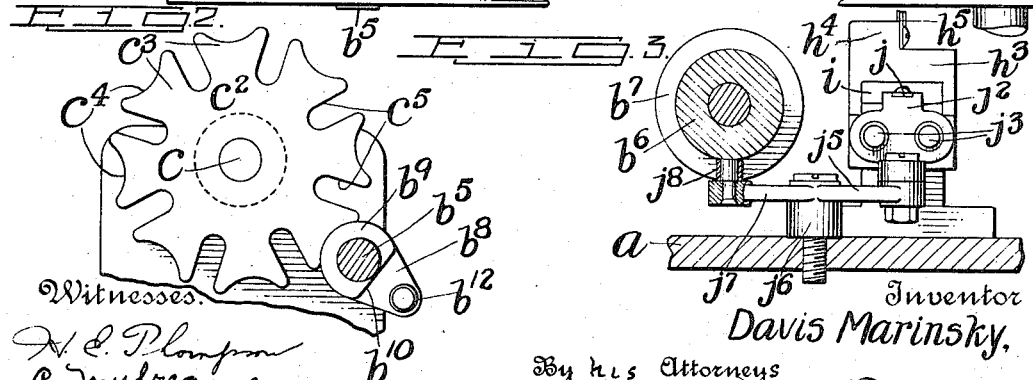

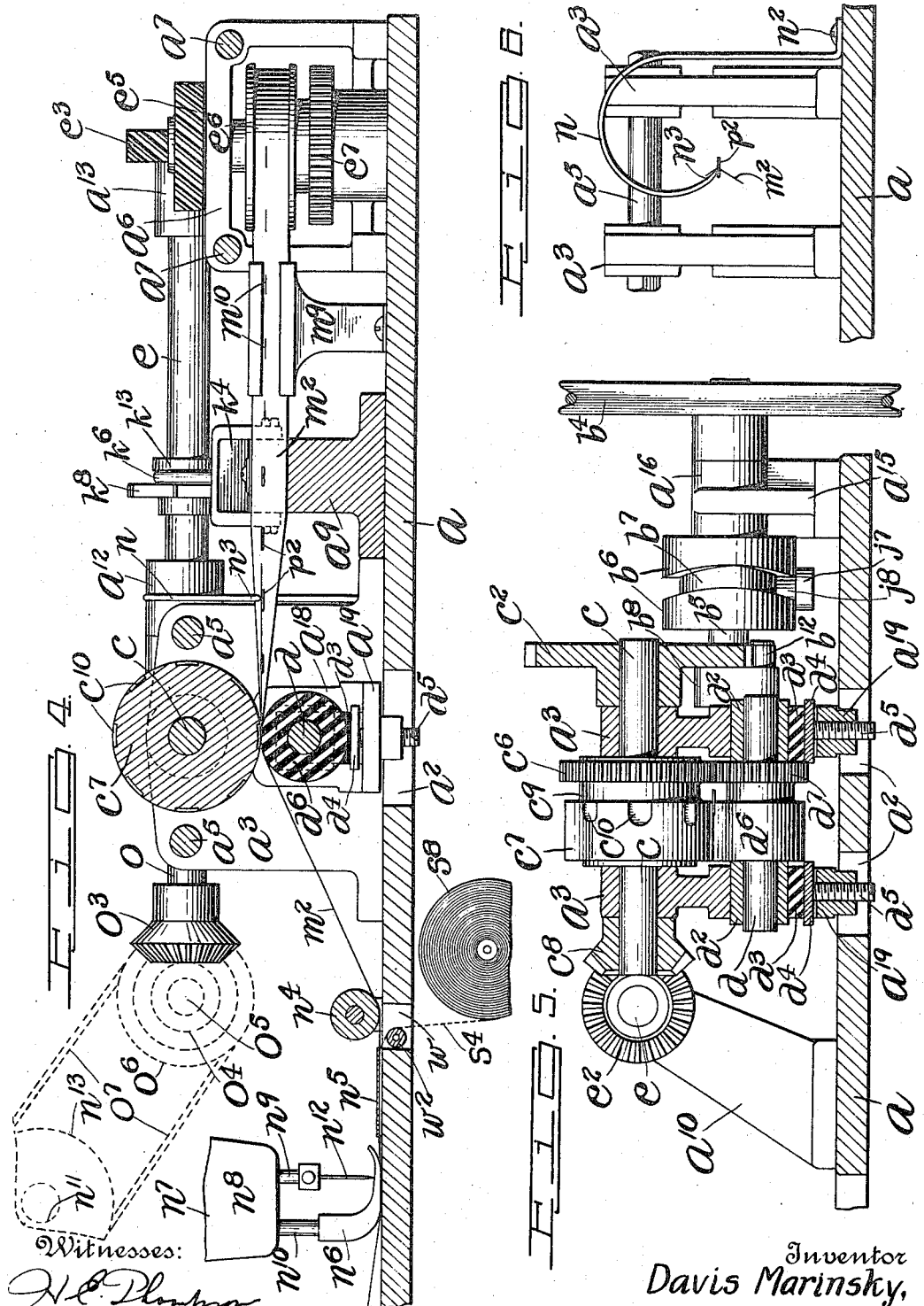

UNITED STATES PATENT OFFICE.

DAVIS MARINSKY, OF NEW YORK, N. Y.

MACHINE FOR MAKING GARMENT-SECURING DEVICES.

1,168,662.      Specification of Letters Patent.      Patented Jan. 18, 1916.

Application filed June 24, 1915. Serial No. 35,990.

*To all whom it may concern:*

Be it known that I, DAVIS MARINSKY, a citizen of the United States, and residing at New York, in the county of New York and State of New York, have invented certain new and useful Improvements in Machines for Making Garment-Securing Devices, of which the following is a specification, such as will enable those skilled in the art to which it appertains to make and use the same.

This invention relates to machines or apparatus for making securing or fastening devices for use in connection with ladies' garments and particularly body garments such as shirt-waists or other waists, and more particularly to securing or fastening devices of the class known as hook and eye strips or tapes, and which involve two separate strips or tapes with one of which the eyes are connected and with the other of which the hooks are connected, said strips or tapes being adapted to be sewed into or connected with the garment in the usual manner; a further object being to provide a machine or apparatus of the class specified by which the entire operation of making securing or fastening devices of the class described may be performed continuously; and with these and other objects in view the invention consists of a machine or apparatus of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a plan view of the main operative parts of my improved machine with the stitching device broken away and with parts of the construction shown in section; Fig. 2 a partial section on the line 2—2 of Fig. 1; Fig. 3 a section on the line 3—3 of Fig. 1; Fig. 4 a section on the line 4—4 of Fig. 1 and indicating the stitching device and omitting parts of the construction; Fig. 5 a partial section on the line 5—5 of Fig. 1; Fig. 6 a partial section on the line 6—6 of Fig. 1; Fig. 7 a partial section on the line 7—7 of Fig. 1; Fig. 8 a partial section on the line 8—8 of Fig. 1; Fig. 9 a partial section on the line 9—9 of Fig. 1; Fig. 10 a sectional detail view of a cutter device which I employ, and shown in Figs. 1 and 8; Fig. 11 a section on the line 11—11 of Fig. 7 and on an enlarged scale; Fig. 12 a side and end view of a feed tube which I employ; Fig. 13 a front view of a part of a complete securing or fastening strip composed of two parts made according to my invention and the separate parts of which are connected; and, Fig. 14 a similar view showing the parts of the securing or fastening strip disconnected.

In the practice of my invention, I provide a main frame comprising a base table $a$ provided centrally thereof with transversely arranged apertures $a^2$ over which are mounted central parallel upright supports $a^3$ secured to the table in the form of construction shown by screws $a^4$ and connected at the top by transverse rods $a^5$, and on the right hand end of the table are other parallel supports $a^6$ connected at the top by transversely arranged rods $a^7$ and secured to the table, in the form of construction shown, by screws $a^8$. Another support $a^9$ is secured to the table between the supports $a^3$ and $a^6$ and adjacent to the supports $a^3$, and at the back of the table are two transversely arranged supports $a^{10}$ and $a^{11}$ provided respectively with bearings $a^{12}$ and $a^{13}$, and the supports $a^{10}$ and $a^{11}$ are also secured to the table, in the form of construction shown, by screws $a^{14}$, and at the front of the table and centrally thereof is another support $a^{15}$ provided with a transversely arranged bearing $a^{16}$ and secured to the table by screws $a^{17}$.

The table $a$ may be supported on legs in the usual manner, or in any preferred way, and at $b$ in Fig. 1, I have indicated the main drive shaft of the machine which may be supported in any desired manner, and which is provided with a drive wheel $b^2$ on which is mounted a drive belt $b^3$ which is also mounted on another drive wheel $b^4$ mounted on a shaft $b^5$ which passes through the bearing $a^{16}$, and which is provided inwardly of said bearing with a cam block $b^6$ having a cam groove $b^7$, and said shaft is provided at its inner end with an arm $b^8$ having a hub $b^9$, one side of which is cut-off transversely as shown at $b^{10}$, and said arm is provided at its free end with a pin $b^{11}$ on the end of which is mounted an anti-friction roller $b^{12}$ as clearly shown in Figs. 1 and 2.

Mounted in the supports $a^3$ is a transverse shaft $c$, the front end of which is provided with a disk $c^2$ provided with a plurality of projecting teeth $c^3$ having arc-shaped recesses $c^4$ in their outer faces and separated by radial recesses $c^5$, and the hub portion $b^9$ of the arm $b^8$ operates in the arc-shaped recesses $c^4$ and the head of the pin $b^{11}$, or the antifriction roller $b^{12}$ on said head operates in the recesses $c^5$.

The shaft $c$ is also provided between the supports $a^3$ with a gear $c^6$ and the roller $c^7$ spaced as shown in Fig. 1, and the parts $c^2$, $c^6$ and $c^7$ rotate or turn with said shaft $c$ and may be secured thereto in any desired manner, and said shaft $c$ is provided at its back, or rear end with a beveled gear $c^8$.

The central bottom portions of the supports $a^3$ are thickened as shown at $a^{18}$, and secured to the bottom of said thickened portions on the inner faces of the supports $a^5$ are supplemental supports $a^{19}$, and mounted in said supports $a^3$ and the thickened portions $a^{18}$ thereof is a shaft $d$, the ends of which are provided with bearings $d^2$ which have a vertical movement in the supports $a^3$ and below which are placed cushions $d^3$ under which are placed plates $d^4$ having screws $d^5$ passed downwardly through the supports $a^{19}$, and the object of this construction is to provide the shaft $d$ with a cushioned support that will permit of its slight vertical movement when in operation, and said shaft is also provided with a roller $d^6$ which bears on the bottom of, or operates in connection with the roller $c^7$, and the shaft $d$ is also provided with a gear $d^7$ which meshes with the gear $c^6$.

A longitudinally arranged shaft $e$ is mounted in the bearing $a^{12}$ and $a^{13}$ and provided at the left end thereof with a beveled gear $e^2$ which meshes with the gear $c^8$, and at its right end with a worm gear $e^3$, and mounted in the back support $a^6$, as clearly shown in Figs. 1 and 8, is a vertical shaft $e^4$ provided at the top thereof with a worm gear $e^5$ which meshes with the gear $e^3$, and within the back support $a^6$ the shaft $e^4$ is provided with a drum or grooved wheel $e^6$ below which is a gear $e^7$, and the parts $e^6$ and $e^7$ turn with the shaft $e^4$ as does also the gear $e^5$.

The back support $a^6$ is a framework in form as is also the front support $a^6$, and the top and bottom parts of the front support $a^5$ are enlarged as shown at $a^{20}$ in Fig. 1, and said top and bottom parts of the front support $a^6$ are provided with rectangular apertures $a^{21}$ across the fronts of which are secured plates $a^{22}$, and mounted in said apertures is a vertical shaft $f$ having bearings $f^2$ which are movable forwardly and backwardly in said apertures and at the front of which are placed cushions $f^3$ of rubber or any other suitable material at the front of which are placed plates $f^4$ provided with screws $f^5$ which pass forwardly through the plates $a^{22}$ and are provided with nuts $f^6$, and by means of this construction the shaft $f$ is cushioned at the front and adapted to yield slightly in its operation and in a forward direction.

The shaft $f$ is also provided with a gear $f^7$ which meshes with the gear $e^7$ and with a cutter disk $g$ which operates in connection with the drum or wheel $e^6$. The cutter disk $g$ is shown in Figs. 1 and 8 and in detail and in section in Fig. 10, and the top portion $g^2$ of said cutter disk is of less diameter than the body portion thereof, and said top portion is provided with projecting beveled cutters $g^3$ which are spaced to correspond with recesses $g^4$ formed in the body of the said cutter disk, and the edge of the cutters $g^3$ project slightly beyond the perimeter of the body portion of said cutter disk.

The support $a^9$ is provided in its opposite sides with vertical rectangular recesses $h$ to receive the sides $h^2$ of a detachable yoke $h^3$ the cross head portion of which is provided with a raised shoulder $h^4$ to which is secured a guide plate $h^5$ having a part $h^6$ which extends downwardly into the cross head portion of said yoke.

In the top of the support $a^9$ is placed a plate $i$ through the opposite side portions of which the sides of the yoke $h^3$ also pass as shown at $i^2$ in Fig. 11, and said plate is recessed at the top thereof to receive the cross head portion of said yoke $h^3$, as shown at $i^3$ in Fig. 7. The plate $i$ is also provided with central slots or recesses $i^4$ and at the rear edge portion thereof with a slot or recess $i^5$.

Placed in and movable longitudinally of the slots or recesses $i^4$ in the plate $i$ is a plunger plate $j$, the front end portion of which is secured to a movable block $j^2$ supported on two pins $j^3$ secured in the support $a^9$ in any desired manner.

Pivoted centrally of the bottom of the block $j^2$ is an arm $j^4$ to the free end portion of which is pivoted one arm $j^5$ of a rocker device which is pivoted to the table $a$ at $j^6$, and the other arm $j^7$ of which is provided with an upwardly directed anti-friction roller $j^8$ which operates in the cam groove $b^7$ in the block $b^6$, and the object of this construction is to give the plunger plate $j$ its movement. The support $a^9$ is provided centrally of the rear end portion of the top thereof with a vertical finger $k$ on which is mounted a movable block $k^2$ provided with an elongated slot or recess $k^3$ in which the finger $k$ operates, and pivoted to the sides of the block $k^2$ is a yoke $k^4$ provided with a rod $k^5$, the rear end portion of which is yoke-shaped in form, as indicated in dotted lines in Fig. 7 at $k^6$, and secured to one side of the rod $k^5$ is an anti-friction roller $k^7$ which operates in connection with a disk $k^8$ secured to the shaft $e$ and the perimeter of which is provided with a plurality of spaced projections or teeth $k^9$ which operate in connection with the roller $k^7$ to advance or oscillate the rod $k^5$ and yoke $k^4$ which, in turn, advances the block $k^2$ which is returned to its normal position by a spring $k^{10}$, one end of which is secured to a pin $k^{11}$ forming part of, or secured to the rod $k^5$, and the other end of which is secured to a ring $k^{12}$ loosely mounted on the shaft $e$. The disk $k^8$ is provided with a hub portion $k^{13}$ which is grooved at $k^{14}$ to receive the yoke $k^6$ of the rod $k^5$. The front edge portion of block $k^2$ is grooved as shown at $k^{15}$ to permit the passage of the main eye or loop portion of what is known as an eye fastening device, as indicated in dotted lines in Fig. 11. The supplemental loops or eyes of which are adapted to pass through the slot or recess $i^5$ in the plate $i$.

Supported on an extension of the table $a$ at the rear edge portion thereof is a pin $m$ adapted to receive a roll of tape $m^2$, one end portion of which is passed through a guide plate $m^3$ secured to the table $a$, and then through a tension device consisting of a plate $m^4$ secured to one side portion of the rear support $a^6$, as clearly shown in Figs. 1 and 9, to which is secured a guide pin $m^5$ and a headed pin $m^6$, and movable on the headed pin $m^6$ is a supplemental jaw plate $m^7$ operated by a spring $m^8$ mounted on the headed pin $m^6$, and the supplemental plate $m^7$ is guided by the guide pin $m^5$, after which it passes around the drum or grooved wheel $e^6$ and between the cutter disk $g$ and said drum, after which it passes through a guide plate $m^9$ and into and between the support $a^9$ and the movable block $k^2$, after which it passes by a folding device consisting of a spring arm $n$ secured to the table $a$ at $n^2$, and the free end portion $n^3$ of which is adapted to fold the tape directly above the eyes in said tape as hereinafter described, after which the folded tape $m^2$ is passed between the rollers $c^7$ and $d^6$, as clearly shown in Fig. 5, and said tape then passes under a roller $n^4$ through a guide plate $n^5$ and beneath the presser foot $n^6$ of an ordinary stitching device or sewing machine $n^7$ of which the arm head $n^8$, the needle bar $n^9$, the presser foot bar $n^{10}$ and the drive shaft $n^{11}$ are indicated in Fig. 4 together with the needle $n^{12}$ connected with the needle bar.

A shaft $o$ is mounted in line with the shaft $e$ and provided with a beveled gear $o^2$ which meshes with the gear $c^8$, and the shaft $o$ is also provided with another beveled gear $o^3$, and the gear $o^3$ operates in connection with another beveled gear $o^4$ mounted on a suitably supported shaft $o^5$, and the shaft $o^5$ is provided with a belt wheel $o^6$ and the drive wheel $n^{13}$ on the shaft $n^{11}$ of the stitching device or sewing machine is geared in connection with the wheel $o^6$ by a belt $o^7$.

The guide plate $h^5$ is curved on its back edge as shown in Fig. 7 and secured thereto is a guide rod $p$ on which, in the form of construction shown, the eye members of the fastening devices are placed as shown at $p^2$ in Fig. 7, and also in Fig. 1. A part of the eye members $p^2$ shown in Fig. 7 are shown in section while the rest thereof are shown in full lines, and the object of the plate $h^5$ is to prevent any lateral movement of the eyes $p^2$ when placed on the rod $p$.

In the operation of this machine, as shown, one rotation of the main drive shaft $b^5$ will turn the shaft $c$ and its connected parts one-eighth of a revolution and the shafts $e$, $e^4$, $f$ and $o$ with their connected parts will be correspondingly rotated, and the rotation of the shaft $e$ will give the block $k^2$ an intermittent forward movement. This operation being effected by the disk $k^8$ and the teeth $k^9$ which operate in connection with the roller $k^7$ mounted on the rod $k^5$, and at each intermittent movement of the disk $k^8$ one of the teeth $k^9$ will stop in contact with the anti-friction roller $k^7$, as indicated in Fig. 7, and the object of this operation is to hold the tape $m^2$ firmly in position during the operation of passing the loop or main eye part of the eye-fastening device through said tape, as indicated in Fig. 11.

In the operation of the machine, as above described, the tape $m^2$ is provided as it passes around the drum $e^6$ with spaced slots $m^{10}$ which are cut therein by the disk $g$, or the cutters $g^3$ thereon, and in this operation the tape $m^2$ folds slightly into the recesses $g^4$ which permits of the operation of said cutters.

It will be understood that the operation of all the parts of this machine pertaining to the movement of the tape, or the feeding thereof to the stitcher are synchronous and are controlled by the main power shaft $b^5$ and the arm $b^8$ with the anti-friction roller $b^{12}$ which operates in the recesses $c^5$ of the disk $c^2$, and these recesses and the teeth on said disk, in the form of construction shown, are eight in number, and the movement of all of the parts pertaining to or controlling the movement of the tape is an intermittent movement.

In the operation of the machine, the eye fastening devices $p^2$ are dropped into the position shown in full lines in Fig. 11, and at each intermittent movement of the tape one of the slots $m^{10}$ therein is brought into line with the plunger $j$ and at the end of each intermittent movement of the tape said plunger is moved backwardly and the eye device is forced through a corresponding slot in the tape, as indicated in dotted lines in Fig. 11, and this operation is repeated after each intermittent movement of said tape.

It must also be borne in mind that the operation of the stitcher is an intermittent movement similar to that of the parts which feed the tape through the machine, and this movement is controlled by the shaft $o$, and the movement of the various parts is such that the stoppage of the tape in order to permit of the insertion of the eye fastening devices, or the passage of said devices through said tape is scarcely perceptible.

In Fig. 13 of the accompanying drawing I have shown a complete securing or fastening strip of the class herein specified and made on my improved machine, and said strip consists of two parts $r$ and $s$, and the part $r$ is provided with the eye fastening devices $p^2$ while the part $s$ is provided with the hook fastening devices $s^2$, and in Fig. 14 these parts are shown separate and in the foregoing description, I have described only the method of forming and folding the part $r$, and in the operation of the machine including the stitcher, as herein described, a line of stitches is passed longitudinally through the folded part $r$ adjacent to the folded edge thereof and through the supplemental eyes $p^3$ of the eye fastening devices, and this secures the said eye fastening devices in the part or strip $r$ and also secures the folded front and back portions of said strip together.

In the construction shown, the part or strip $s$ of the complete securing device is made of two portions, a front part $s^3$ and a back part $s^4$, and in forming this part of the complete securing or fastening device, I substitute for the rod $p$ and plate $h^5$ a tubular guide $u$ which is of the form in cross section shown in Fig. 12 and through which the hook fasteners $s^2$ are passed, and the form of the tubular guide $u$ in cross section is the same as that of the hook fasteners $s^2$ in plan. In this operation, the folding device $n$ is detached and the front part $s^3$ of the hook portion of the complete securing device is fed through the machine far enough to permit of the insertion of the hook fastening devices $s^2$, in which operation the hook members $s^5$ of said fastening devices are passed through slots formed in said front strip or part $s^3$, the same as in the operation of passing the part $r$ through the machine. The said strip member $s^3$ is not folded but is passed between the rollers $c^7$ and $d^6$ and under the guide roller $n^4$ and under the presser foot $n^6$ of the stitching device of the machine, and in this operation a line of stitches $s^6$ is formed which passes through the supplemental eyes $s^7$ of the said hook fastening devices and through the strip $s^3$ and secure the said fastening devices to said strip.

The back strip $s^4$ of the part $s$ of the complete securing device is wound into a roll $s^8$ mounted under the left hand portion of the machine and between the stitching device and the rollers $c^7$ and $d^6$ and, in the above described operation, the strip $s^4$ is passed upwardly through an opening $w$ in the base plate $a$ and around a guide roller $w^2$ and is fed through the guide $n^5$ under the strip $s^3$ and to and beneath the presser foot $n^6$ of the stitching device and the line of stitches $s^6$ passes through both the front and back parts $s^3$ and $s^4$ of the part $s$ of the complete securing device, and after this operation another line of stitches $s^9$ is formed which secures the front edges of the parts $s^3$ and $s^4$ together, and this operation is performed on an independent machine.

I have not shown the operation of passing the strip $s^3$ through the machine but it will be understood that this operation is exactly the same as that of passing the strip $r$ through the machine, the only difference being in the application of the strip $s^4$ to the back of the strip $s^3$ as herein described.

The separate parts or members $r$ and $s$ of the complete securing device are preferably formed from ordinary tape of suitable width and the part $s$ is preferably wider than the part $r$ and when the said parts are connected as shown in Fig. 13 the hook and eye members are entirely covered or concealed at the back but are exposed at the front which condition results from the method of passing said hook and eye members through the parts $r$ and $s$ and the position of the hook members on the part $s$.

The rollers $c^7$ and $d^6$ operate as feed rollers and the roller $d^6$ is composed of soft rubber or of similar elastic material while the roller $c^7$ is composed of metal or other hard material and, in the construction shown, the roller $c^7$ is provided with a hub $c^9$ on which the gear $c^6$ is mounted, and the face of the roller $c^7$ is provided with spaced recesses $c^{10}$ to receive the hook and eye fastening devices when strips or tapes $r$ and $s$ are passed through the machine, as herein shown and described, this construction being necessary in order to prevent injury to the hooks and in order to prevent the cutting of the strips or tapes after the hooks and eyes have been secured therein.

It will be understood, however, that the separate parts $r$ and $s$ of my improved securing or fastening device may be of any desired width and in the use thereof said parts are secured in the garment in the usual manner; and while I have shown and described the preferred form and construction of my improved machine, my invention is not limited to the details of the various parts thereof as herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. In a machine of the class described, a frame, means for supporting a fabric strip roll in connection therewith, means for feeding said strip through the machine, means for slitting said strip at intervals, means for inserting fastening devices into the slits thus formed, and means for stitching said strip longitudinally and for securing the fastening devices thereto.

2. In a machine of the class described, a frame, means for supporting a fabric strip roll in connection therewith, means for feeding said strip through the machine step by step, means for forming slits in said strip at each movement thereof, means for inserting fastening devices into said slits, and means for stitching said strip longitudinally and securing the fastening devices thereto.

3. In a machine of the class described, a frame, means for supporting a fabric strip roll in connection therewith, means for feeding said strip through the machine, means for inserting fastening devices thereinto, and means for stitching said strip longitudinally and securing said fastening devices thereto.

4. In a machine of the class described, a frame, means for supporting a fabric strip roll in connection therewith, means for feeding said strip through the machine, means for inserting fastening devices into said strip, means for folding said strip and means for stitching said strip longitudinally and securing the fastening devices thereto.

5. In a machine of the class described, a frame, means for supporting a fabric strip roll in connection therewith, means for feeding said strip through the machine, means for slitting said strip at intervals, means for inserting fastening devices into the slits formed in said strip, means for applying a supplemental strip to the back thereof, and means for stitching said strips longitudinally to secure them together and to secure said fastening devices thereto.

6. In a machine of the class described, a frame, means for supporting a fabric strip roll therein, a drum around which said strip is passed, means coöperating with said drum for slitting said strip at intervals, means for inserting fastening devices into the slits formed in said strip, means for feeding said strip through the machine, and means for stitching said strip longitudinally to secure the fastening devices thereto.

7. In a machine of the class described, means for feeding a strip through the machine, means for folding said strip, means for applying fastening devices in the fold of said strip, and means for stitching said strip longitudinally of the fold to secure the fastening devices thereto.

8. In a machine of the class described, means for feeding a strip through the machine, means for slitting said strip at intervals, means for inserting members into the slits thus formed, means for folding said strip, and means for stitching said strip longitudinally of the fold to secure said members thereto.

In testimony that I claim the foregoing as my invention I have signed my name in presence of the subscribing witnesses this 21st day of June 1915.

DAVIS MARINSKY.

Witnesses:
C. MULREANY,
H. E. THOMPSON.